United States Patent [19]

Schintgen

[11] Patent Number: 4,634,093
[45] Date of Patent: Jan. 6, 1987

[54] MOUNTING MEANS FOR VALVE DISC

[75] Inventor: Robert J. Schintgen, New Berlin, Wis.

[73] Assignee: Vilter Manufacturing Corporation, Milwaukee, Wis.

[21] Appl. No.: 784,776

[22] Filed: Oct. 7, 1985

[51] Int. Cl.[4] ............................................. F16K 31/50
[52] U.S. Cl. ...................................... 251/82; 251/273
[58] Field of Search ..................... 251/77, 82, 88, 264, 251/273

[56] References Cited

U.S. PATENT DOCUMENTS

| | | | |
|---|---|---|---|
| 345,197 | 7/1886 | Wade | 251/82 |
| 589,142 | 8/1897 | Roseberry | 251/82 |
| 772,287 | 10/1904 | McCarl | 251/82 |
| 963,836 | 7/1910 | Varlie | 251/82 |
| 1,069,282 | 8/1913 | Oderman | 251/88 |
| 1,928,071 | 9/1933 | Mueller | 251/77 |
| 4,356,996 | 11/1982 | Linder et al. | 251/82 |
| 4,484,596 | 11/1984 | Hikade et al. | 251/264 |

Primary Examiner—George L. Walton
Attorney, Agent, or Firm—James E. Nilles; Thomas F. Kirby

[57] ABSTRACT

A manually operated valve is usable as a shut-off and stop/check valve for handling refrigerant fluids in a system subject to reverse fluid flow. The valve comprises a hollow valve body having fluid inlet and outlet ports, a valve plate within the body with a fluid flow passage therethrough, an annular valve seat on the valve plate around the passage, a hollow internally threaded valve stem sleeve attached to the valve body, a rotatable and axially shiftable externally threaded valve stem extending through the valve stem sleeve into the valve body, and a valve disc which is rotatably and axially shiftably mounted on the inner end of the valve stem and releasably engageable with the valve seat to open and close the valve. Rotation and axial shifting of the valve stem effects axial shifting of the valve disc to open and close the valve to enable it to function as a shut-off valve. Axial shifting of the valve disc relative to the valve stem enables it to function as a check valve in reverse fluid flow conditions, when the valve stem is in a partially raised axial position. Rotation of the valve disc relative to the valve seat as they move into and out of engagement, which would eventually result in wear and leakage, is prevented by an anti-rotation pin which is mounted on the stationary valve sleeve and slidably engages a pin-receiving hole in the valve disc.

13 Claims, 3 Drawing Figures

MOUNTING MEANS FOR VALVE DISC

BACKGROUND OF THE INVENTION

1. Field of Use

This invention relates generally to shut-off and stop/check valves for fluids used in refrigeration systems or the like.

In particular, it relates to improved means for mounting a valve disc on a valve stem.

2. Description of the Prior Art

A manually operated shut-off valve typically comprises a hollow valve housing having a valve plate therewithin with a fluid passage therethrough and having a valve seat therearound. An externally threaded valve stem mounted for rotation and axial shifting movement in an internally threaded hollow valve stem sleeve operates a valve disc which is axially shiftable to open and close the fluid passage in response to rotation and axial shifting of the valve stem in the appropriate direction. Rotation of the valve stem causes the valve stem and the valve disc thereon to shift axially. Thus, the valve disc can move toward a seated position wherein it engages the valve seat (valve closed), or away from the valve seat to an unseated position wherein it is disengaged from the valve seat (valve open). In one type of valve, the valve disc is integral with the valve stem so that the valve disc rotates along with the rotating valve stem. Since the valve seat is stationary and the valve disc is rotatable relative thereto, friction and resultant wear occur at their interface during seating and unseating of the valve disc. Over time, such wear on either or both components can cause fluid leakage at the interface, even when the valve disc is fully seated and the valve is closed. In another type of valve, the valve disc is rotatably mounted on the valve stem and rotation or spinning of the disc is caused by the turbulent flow of the fluid through the valve. Valve disc rotation stops soon after the valve disc engages the valve seat as the valve closes and rotation does not resume until the valve disc is nearly disengaged from the valve seat. Such spinning causes excessive wear between the disc and valve stem. Both of the aforesaid types of valves often include babbitt metal inserts at the interface between the valve disc and valve seat. If the disc is allowed to spin on the stem when the valve is open, random mating of the disc and seat occurs upon closure. As a result the babbitt metal insert must be deformed differently to conform to the irregularities of the seat each time the valve is closed. This requires extra force to obtain a tight seat. Such insert is subject to mechanical wear and leakage and eventually needs to be replaced. Many attempts have been made to overcome these problems. For example, resilient washers made of rubber or plastic have been provided at the valve seat interface, such washers being mounted on either or both components. However, this arrangement is usually unsatisfactory in valves which handle high pressure fluids, or corrosive fluids, or abrasive fluids, because these fluids can damage or destroy rubber or plastic washers.

In so-called stop/check valves, as distinguished from conventional shut-off valves, not only must the valve disc move between open and closed positions in response to rotation and axially shifting of the valve stem, but the valve disc must also be capable of moving independently from open to closed position in response to pressure differentials on opposite sides of the valve disc which could cause unwanted reverse flow of fluid through the valve, even though the valve stem is still in an open position. When the valve operates as a check valve, the reverse flow pressure difference is usually low. Since this is the only force available to close the valve, it is not sufficient to obtain a tight seat with random mating. These requirements pose additional problems as regards the design, construction and operation of the valve disc mounting means in a shut-off and stop/check valve. Various prior art means have been proposed to prevent valve disc rotation in conventional shut-off valves but, very often, such prior art means are relatively complex in construction and mode of operation. Furthermore, such means are not well-adapted for application to stop/check valves.

SUMMARY OF THE INVENTION

A manually operated valve in accordance with the invention is well-adapted for handling refrigerant fluids (in liquid or gaseous form) in those portions of a refrigeration system wherein it needs to function both as a manually operated conventional shut-off valve and as an automatically operating stop/check valve for preventing unwanted reverse flow of fluid in the system.

The valve comprises a valve housing including a hollow valve body and a valve stem sleeve mounted on or integral with the valve body. The valve body has a fluid inlet port, a fluid outlet port and a valve stem opening for accommodating an externally threaded manually rotatable, axially shiftable valve stem extending into the hollow valve body through an internally threaded hole in the valve stem sleeve. A valve plate is located in the hollow valve body and has a fluid passage therethrough for accommodating fluid flow between the inlet port and the outlet port. Desired fluid flow is from the inlet port, through the passage, to the outlet port. An annular valve seat is provided on the valve plate around the fluid passage. A valve disc is disposed in the hollow valve body for axial shifting movement into and out of engagement with the valve seat to effect closing and opening, respectively, of the valve. Preferably, the valve disc comprises a soft metal insert, such as babbitt metal for engaging the valve seat. Mounting means are provided for mounting the valve disc on the valve stem. The mounting means enable the valve disc to be moved axially between open and closed positions relative to valve seat by the axial shifting movement of the valve stem so that the valve can perform normal valve open/close functions. The mounting means also enable the valve disc to be relatively rotatable with respect to the valve stem so that the valve disc does not rotate as the valve stem rotates. The mounting means also enable the valve disc to shift axially relative to the valve stem to seated (closed) position on the valve seat even while the valve stem is in open position in response to a fluid pressure increase at the fluid outlet port of the valve body which could result in reverse fluid flow through the valve. Anti-rotation means are provided to prevent rotation of the valve disc relative to the valve seat, either in response to rotation of the valve spindle or in response to fluid flow (forward or reverse) or fluid turbulence inside the valve body, so as to ensure that the valve disc always seats on or mates in the same position on the valve seat when the valve is closed, and so as to prevent the disc from spinning on the valve stem when the valve is open.

The aforesaid anti-rotation means comprises an elongated member, in the form of a roll pin, extending between the valve sleeve and the valve disc. The elongated member has one end engaged with one of said valve sleeve and said valve disc and has another end slidably engaged in a hole formed in the other of said valve sleeve and said valve disc. In the preferred embodiment, the elongated member has one end fixedly engaged in a mounting hole in the valve sleeve and has its other end slidably engaged in a receiving hole in the valve disc.

A valve having valve disc mounting means and anti-rotation means in accordance with the present invention has several advantages over the prior art. For example, the valve disc always maintains the same angular position relative to the valve seat regardless of whether the valve is open or closed and always seats in exactly the same position. This holds true whether the valve is functioning in the conventional shut-off mode or in the stop/check mode. Rotational friction and wear at the interface between the valve disc and valve seat is entirely eliminated. The insert takes on the contour of the valve seat. Spinning of the valve disc on the valve stem is also eliminated thereby eliminating wear therebetween. Wear at the interface between the valve disc and valve seat occurs only as a result of minor relative axial (not rotational) movement at the interface. Any such axial wear occurs at the same locations on mating surfaces. The disc always mates with the seat in the same position when the valve is closed. In this manner the babbitt metal insert readily conforms to the irregularities of the seat. As a result a minimum force on the disc is required to obtain a leak proof seat. Thus, the invention reduces the risk of fluid leakage, prolongs the time needed for replacement of worn parts, and reduces servicing costs. The mounting means and anti-rotation means are simple in concept, readily adapted to suit valves of conventional construction, and easy and economical to manufacture and install. The components of the several means are reliable in use and normally require no servicing or replacement. The roll pins are commercially available low-cost components available in various lengths and diameters to suit particular valve sizes. The inherent resiliency of a roll pin (in the direction perpendicular to its axis) maintains it mounted in fixed position in the mounting hole on the valve spindle sleeve. The pin ensures positive angular positioning of the valve disc. Friction and wear which occur as the pin slides in and out of the pin-receiving hole in the valve disc is held to a minimum by making the diameter of the pin-receiving hole slightly larger than the diameter of the pin. Other objects and advantages will hereinafter appear.

DRAWINGS

DESCRIPTION OF A PREFERRED EMBODIMENT

Figure 1:
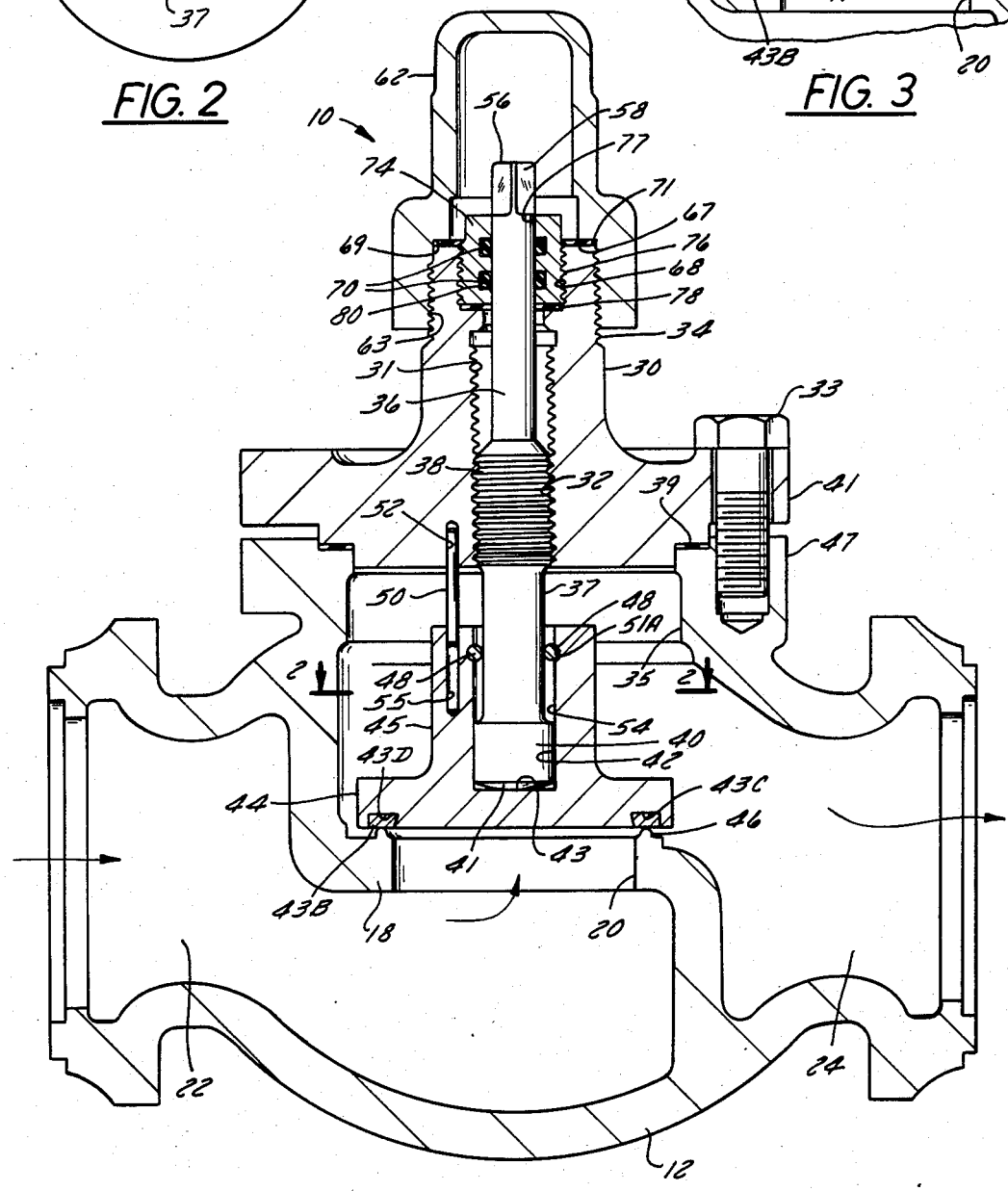
FIG. 1 is a cross-section view of a stop/check valve embodying anti-rotation means for the valve disc in accordance with the present invention.

FIG. 1 of the drawing shows a manually operated valve 10 in accordance with the invention which is well-adapted for handling high pressure, corrosive refrigerant fluids (in liquid or gaseous form) such as are used in large refrigeration systems (not shown) but could have other uses. The valve 10 is also especially well-adapted for use in those portions of a refrigeration system (not shown) wherein it needs both to function as a manually operated conventional shut-off valve for starting and stopping fluid flow and to function as a stop/check valve to prevent unwanted reverse flow of fluid in the system, as in a fluid line (not shown) connected to a gas compressor (not shown) in which the pressure differential across the valve disc reverses and fluid flow through the valve tends to reverse when the compressor stops operating.

Valve 10 comprises a valve housing including a hollow generally spherical cast metal valve body 12 and a valve stem sleeve 30 mounted on the valve body by bolts 33 (only one shown). Valve body 12 has a fluid inlet port 22, a fluid outlet port 24 on its opposite sides and a valve stem receiving opening 35 at its top for accommodating an externally threaded manually rotatable, axially shiftable valve stem 36. Valve stem 36 extends into hollow valve body 12 through an internally threaded cylindrical bore or hole 31 in valve stem sleeve 30. An integrally formed valve plate 18 is located inside hollow valve body 12 and has a circular fluid flow passage or aperture 20 therethrough for accommodating fluid flow between inlet port 22 and outlet port 24. Desired fluid flow is from inlet port 22, through passage 20, to outlet port 24. An annular valve seat 46 is provided on the upper side of valve plate 18 around fluid passage 20. A valve disc 44 is disposed inside hollow valve body 12 and is adapted for axial shifting movement along its axis into and out of engagement with valve seat 46 to effect closing and opening, respectively, of valve 10. The generally cylindrical bore 31 in valve sleeve 30 is internally threaded at 32 and 68 and externally threaded as at 34. Bore 31 registers and communicates with valve stem receiving hole 35 in the top of valve body 12.

The rotatable and axially shiftable valve stem 36 is mounted in and extends through bore 31 of valve stem sleeve 30 and has external threads 38 thereon which engage the internal threads 32 in bore 31 of sleeve 30. A sealing gasket 39 is disposed between a mounting flange 41 on sleeve 30 and a mounting flange 47 on valve body 12 around valve stem receiving hole 35.

Figure 3:
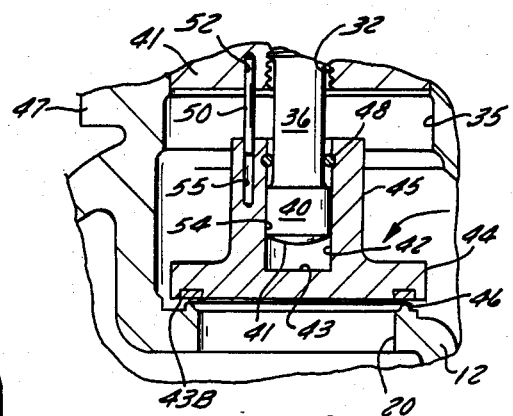
FIG. 3 is a reduced-scale cross-section view of a portion of FIG. 1 and showing the valve disc in closed position and the associated valve stem in partially raised position.

Mounting means are provided for mounting valve disc 44 on valve stem 36. The mounting means enable valve disc 44 to be moved axially between open and closed (see FIG. 1) positions relative to valve seat 46 by the axial shifting movement of valve stem 36 so that the valve can perform normal valve open/close functions. The mounting means also enable valve disc 44 to be relatively rotatable with respect to valve stem 36 so that the valve disc does not rotate as the valve stem rotates. As FIG. 3 shows, the mounting means also enable valve disc 44 to shift axially downward relative to valve stem 36 to seated (closed) position on valve seat 46 when valve stem 36 is in partially open position (i.e., raised about half-way upward or less) in response to a fluid pressure increase at fluid outlet port 24 of valve body 12 which could result in reverse fluid flow through valve 10.

Figure 2:
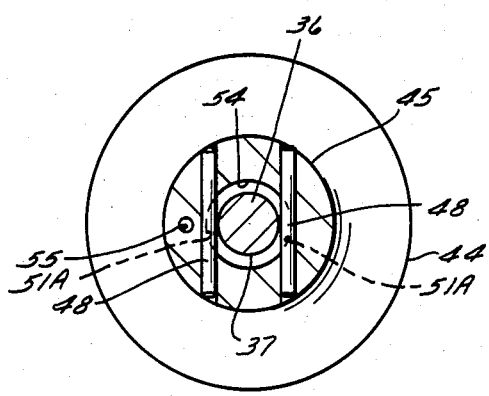
FIG. 2 is a cross-section view taken on line 2—2 of FIG. 1.

Valve stem 36 has a cylindrical inner end portion 40 which extends into a cylindrical bore or recess 42 formed in a neck portion 45 of valve disc 44. Valve disc 44 is releasably engageable with annular valve seat 46 around fluid flow passage 20 in valve plate 18. Valve seat 46 is a hardened annular-shaped projection formed on valve plate 18 for engagement with a flat annular-shaped mating surface 43B of an annular soft metal (Babbitt metal, for example) insert 43C located in an annular recess 43D formed in the bottom side of valve disc 44. As FIGS. 1 and 2 show, valve disc 44 is slidably and rotatably secured on valve stem 36 by two metal roll pins 48 of circular cross-section which extend into holes 51 formed in neck portion 45 of valve disc 44. The holes 51 define annular grooves 51A in the peripheral wall 54 of cylindrical recess 42 in valve disc neck portion 45. The cylindrical inner end portion 40 of valve stem 36 is of larger diameter than the adjacent cylindrical portion 37 of valve stem 36 against which the roll pins 48 bear and this prevents valve disc 44 from axially separating from valve stem 36 as the valve stem shifts axially upwardly. This also allows for upward and downward axial shifting movement of valve disc 44 relative to valve stem 36, as hereafter explained. The lower face 41 of inner end portion 40 of valve stem 36 is slightly rounded or curved and bears against a lower end wall 43 of recess 42 in valve disc 44 during valve closure to effect seating of valve disc 44 tightly against valve seat 46 when valve 10 functions as a shut-off valve and is fully closed, as shown in FIG. 1. The cylindrical inner end portion 40 of valve stem 36 is slidably and rotatably received in the relatively longer cylindrical recess 42. Relative axial movement between valve disc 44 and lower end portion 40 of valve stem 36 is limited by lower end wall 43 of valve disc recess 42 and by the roll pins 48 mounted near the upper open end of valve disc recess 42.

The outer end 56 of valve stem 36 is provided with flats 58 which enable it to be engaged either by a detachable wrench (not shown) or hand-wheel (not shown) and rotated between open and closed positions. As valve stem 36 rotates, the inter-engaging threads 32 and 38 cause the stem to shift axially between its open (upward) and closed (downward) positions.

To prevent leakage, a hollow plug 74, externally threaded as at 76, and having a hole 77 therethrough, is disposed on outer end 56 of valve stem 36 and is screwed into threaded portion 68 in bore 31 of valve stem sleeve 30. Plug 74 entraps a compressible sealing washer 78 so as to form a seal in bore 31 between valve stem 36 and valve stem sleeve 30. Plug 74 has a plurality of internal grooves 70 which entrap a plurality of O-rings 80 between valve stem 36 and hole 77 in plug 74. A removable end cap 62 is provided to protect the outer end 56 of valve stem 36 and to provide an additional seal against possible fluid leakage through bore 31. Cap 62 has internal threads 63 which engage the external threads 34 on the outside of valve stem sleeve 30. A sealing washer 67 is disposed between the upper end surface 71 of sleeve 30 and a shoulder 69 on the inside of cap 62. Unscrewing of cap 62 and plug 74 affords access to the sealing washers 67, 78 and O-rings 80.

As FIGS. 1 and 2 show, anti-rotation means are provided to prevent rotation of valve disc 44 relative to valve seat 46, either in response to rotation of valve stem 36 or in response to fluid flow (forward or reverse) or fluid turbulence inside valve body 12, so as to ensure that valve disc 44 always seats on the same position on valve seat 46, and to ensure that the valve disc 44 does not spin on valve stem 36, thus eliminating friction and wear between the disc and the valve stem. The anti-rotation means comprises an elongated member 50 extending between stationary valve stem sleeve 30 and valve disc 44. Elongated member 50 has one (upper) end fixedly engaged in a mounting hole 52 in valve stem sleeve 30 and has its other (lower) end slidably engaged in a receiving hole 55 drilled in the upper side of valve disc 44. The maximum distance elongated member 50 can slide in receiving hole 55 without disengaging therefrom is at least as great as the distance that valve disc 44 can be shifted axially on valve stem 36 so as to ensure proper seating of valve disc 44 on valve seat 46 when valve 10 is fully closed. Elongated member 50 takes the form of a resilient roll pin which is inserted in fixed position in mounting hole 52 in valve stem sleeve 30 and slidably received in receiving hole 55 in valve disc 44 before valve stem sleeve 30 is bolted to valve body 12.

In FIG. 1, valve 10 is shown closed, as when valve 10 is operated as a shut-off valve. When valve stem 36 is rotated in the opening direction, the valve stem 36 moves or shifts axially upward. The positive pressure of the fluid entering inlet port 22 forces valve disc 44 upward off of valve seat 46 and against the lower end face 41 of valve stem 36, as fluid flows from inlet port 22, through passage 20 to outlet port 24. When valve stem 36 is rotated in the closing direction, the stem moves or shifts axially downward and causes valve disc 44 to move toward closed position, as FIG. 1 shows. Pin 50 operates to prevent valve disc 44 from rotating in response to rotation of valve stem 36 in either direction.

As FIG. 3 shows, while valve 10 is partially open and valve stem 36 is in some raised position (other than fully raised position and typically about one-half of fully raised position), if fluid pressure at outlet port 24 begins to exceed that at inlet port 22, fluid flow through valve 10 would tend to reverse. However, valve 10 can also operate as a stop/check valve, because valve disc 44 is responsive to this pressure differential on its opposite surfaces and is free to shift or move axially downward on valve stem 36 to closed position wherein it engages valve seat 46 and closes valve 10, as FIG. 3 shows. As valve disc 44 moves downward, and when it is in closed position, it remains engaged with pin 50 and, therefore, does not rotate relative to valve seat 46. If fluid pressure again reverses and fluid flow returns to normal, valve disc 44 slides upwardly on valve stem 36 which has remained in its original axial position. Since pin 50 is always engaged with valve disc 44, valve disc rotation cannot occur either in response to rotation of valve stem 36 or in response to fluid flow or turbulence within valve body 12.

I claim:
1. In a combined shut-off and stop-check valve:
   a valve housing;
   a rotatable and axially shiftable valve stem disposed within said housing, said valve stem being axially shiftable between closed and open positions and intermediate positions therebetween;
   a valve seat in said housing and disposed around a fluid passage;
   a valve disc in said housing and rotatably and axially slidably mounted on said valve stem, said valve disc being movable relative to said valve seat be- tween closed and open positions and intermediate positions therebetween in response to axial shifting movement of said valve stem, said valve disc also being movable relative to said valve seat and relative to said valve stem from an intermediate position to closed position in response to reverse fluid flow in said fluid passage when said valve stem is in an intermediate position;

and means connected between said valve housing and said valve disc for preventing rotation of said valve disc relative to said valve seat but allowing sliding movement of said valve disc on said valve stem in any of said intermedaite positions.

2. A combined shut-off and stop-check valve for controlling fluid flow comprising:
 a valve housing;
 a valve seat in said housing disposed around a fluid passage through which fluid can flow;
 a valve disc in said housing for releasable engagement with said valve seat to open and close said fluid passage;
 a rotatable and axially shiftable valve stem disposed within said housing, said valve stem being axially shiftable between closed and open positions and intermediate positions therebetween;
 mounting means for rotatably mounting said valve disc on said valve stem so that axial shifting movement of said valve disc relative to said valve seat can occur in response both to axial shifting movement of said valve stem and in response to fluid flow in said valve housing, said valve disc being movable relative to said valve seat between closed and open positions and intermediate positions therebetween in response to axial shifting movement of said valve stem, said valve disc also being movable relative to said valve seat and relative to said valve stem from an intermediate position to closed position in response to reverse fluid flow in said fluid passage when said valve stem is in an intermediate position;
 and anti-rotation means connected between said valve housing and said valve disc for preventing rotation of said valve disc relative to said valve seat but allowing axial shifting of said valve disc on said valve stem in any of said intermediate positions.

3. A combined shut-off and stop-check valve comprising:
 a hollow valve housing,
 a valve plate within said valve housing and having a fluid passage therethrough;
 an annular valve seat on said valve plate around said fluid passage;
 a valve stem rotatably and axially shiftably mounted on said valve housing and extending into said valve housing, said valve stem being axially shiftable between closed and open positions and intermedite positions therebetween;
 a valve disc in said housing engageable with and disengageable from said valve seat to effect closing and opening, respectively, of said fluid passage;
 means for mounting said valve disc on said valve stem to enable axial shifting movement of said valve stem to effect axial shifting movement of said valve disc relative to said valve seat and to enable fluid flow in said housing to effect axial shifting movement of said valve disc relative to said valve stem and relative to said valve seat, said valve disc being movable relative to said valve seat between closed and open positions and intermediate positions therebetween in response to axial shifting movement of said valve stem, said valve disc also being movable relative to said valve seat and relative to said valve stem from an intermediate position to closed position in response to reverse fluid flow in said fluid passage when said valve stem is in an intermediate position;
 and anti-rotation means connected between said valve housing and said valve disc for preventing rotation of said valve disc relative to said valve seat as said valve stem rotates but allowing axial shifting movement of said valve disc on said valve stem in any of said intermediate positions.

4. A combined shut-off and stop-check valve comprising:
 a hollow valve housing,
 a valve plate within said valve body and having a fluid passage therethrough:
 an annular valve seat on said valve plate around said fluid passage;
 a valve stem rotatably and axially shiftably mounted on said valve housing and extending into said valve housing, said valve stem being axially shiftable between closed and open positions and intermediate positions therebetween;
 a valve disc in said housing engageable with and disengageable from said valve seat to effect closing and opening, respectively, of said fluid passage;
 means for rotatably mounting said valve disc on said valve stem and for enabling axial shifting movement of said valve stem to effect axial shifting movement of said valve disc relative to said valve seat, said valve disc being movable relative to said valve seat between closed and oen positions and intermediate positions therebetween in response to axial shifting movement of said valve stem, said valve disc also being movable relative to said valve seat and relative to said valve stem from an intermediate position to closed position in response to reverse fluid flow in said fluid passage when said valve stem is in an intermediate position;
 and anti-rotation means connected between said valve housing and said valve disc for preventing rotation of said valve disc relative to said valve seat as said valve stem rotates but allowing axial shifting movement of said valve disc on said valve stem in any of said intermedite positions.

5. A combined shut-off and stop-check valve comprising:
 a hollow valve body having fluid ports and a valve stem hole therein;
 a valve plate within said valve body and having a fluid passage therethrough;
 valve seat on said valve plate and surrounding said fluid passage;
 a hollow valve stem sleeve attached to said valve body and overlying said valve hole:
 a valve stem rotatably mounted in said valve sleeve and axially shiftable therein within said housing, said valve stem being axially shiftable between closed and open positions and intermediate positions therebetween;
 said valve stem having an inner end;
 a valve disc on said inner end of said valve stem and relatively rotatable for at least some predetermined angular distance relative thereto, said valve disc being movable toward and away from said valve seat as said valve stem is rotated and is axially shifted, said valve disc being movable relative to said valve seat between closed and open positions and intermediate positions therebetween in response to axial shifting movement of said valve stem, said valve disc also being movable relative to said valve seat and relative to said valve stem from an intermediate position to closed position in response to reverse fluid flow in said fluid passage when said valve stem is in an intermediate position; and an anti-rotation means engaging said valve sleeve and said valve disc to prevent rotation of said valve disc relative to said valve seat as said valve stem is rotated to ensure that said valve disc always seats in the same position on said valve seat but allowing axial shifting movement of said valve disc on said valve stem in any of said intermediate positions.

6. A valve according to claim 5 wherein said anti-rotation means comprises an elongated member extending between said valve sleeve and said valve disc.

7. A valve according to claim 6 wherein said elongated member has one end engaged with one of said valve sleeve and said valve disc and has another end slidably engaged in a hole formed in the other of said valve sleeve and said valve disc.

8. A valve according to claim 6 wherein said elongated member has one end engaged in a hole in said valve sleeve and has another end slidably engaged in a hole in said valve disc.

9. A valve according to claim 8 wherein the maximum distance said elongated member can slide in said hole in said valve disc is at least as great as the distance said valve disc can be shifted axially so as to ensure proper seating of said valve disc on said valve seat.

10. A valve according to claim 9 wherein said fluid passage in said valve plate is circular and the centerpoint thereof is aligned with the extended axis of said bore through said valve stem sleeve.

11. A valve according to claim 10 wherein said valve stem is axially movable in said valve sleeve during operation and said valve disc moves axially toward and away from said aperture in said valve plate.

12. A valve according to claim 11 wherein said hollow valve stem sleeve has internal screw threads therein and wherein said valve stem has external screw threads thereon engaged with said internal screw threads whereby rotation of said valve stem effects axial movement of said valve stem.

13. A valve according to claim 5 or 12 wherein said valve disc is mounted for axial sliding movement on said valve stem so as to be axially shiftable to closed position responsive to pressure differentials thereacross when the axial position of said valve stem is some raised position.

* * * * *